H. W. DARR.
WHEEL TIRE.
APPLICATION FILED JAN. 10, 1911.
1,111,648.
Patented Sept. 22, 1914.
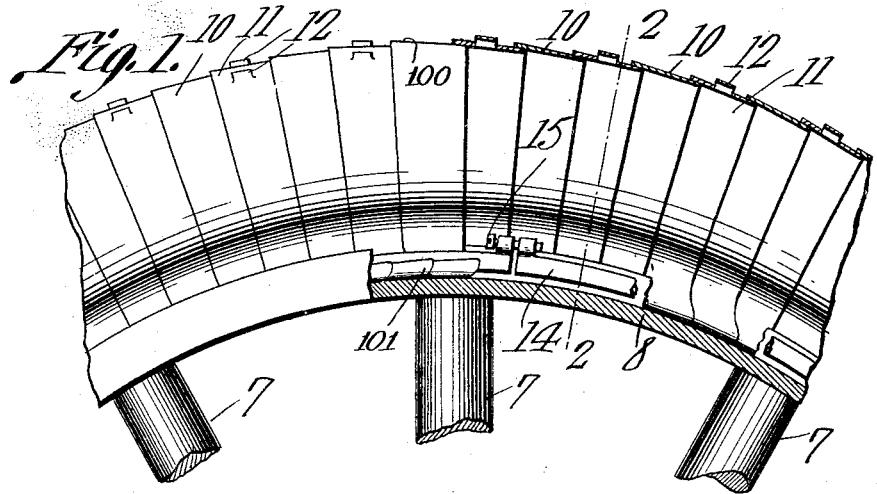
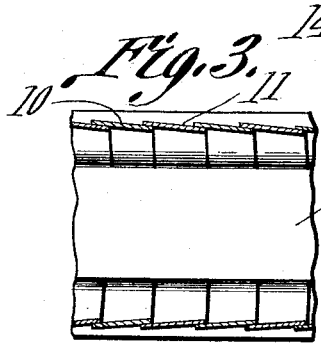
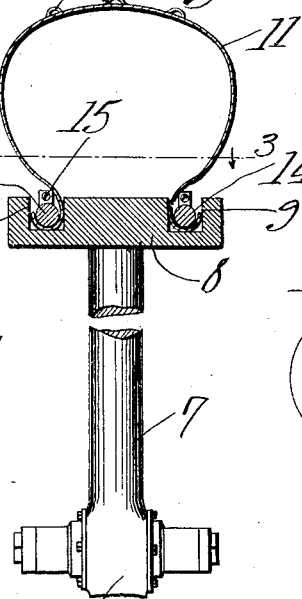
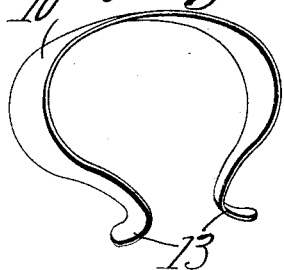
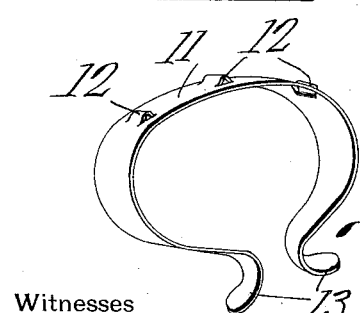
Witnesses
H. W. Darr,
Inventor
by
Attorneys

UNITED STATES PATENT OFFICE.

HENRY W. DARR, OF REDWING, KANSAS, ASSIGNOR OF ONE-HALF TO WALTER W. HEROLD, OF ELLINWOOD, KANSAS.

WHEEL-TIRE.

1,111,648.   Specification of Letters Patent.   Patented Sept. 22, 1914.

Application filed January 10, 1911. Serial No. 601,834.

*To all whom it may concern:*

Be it known that I, HENRY W. DARR, a citizen of the United States, residing at Redwing, in the county of Barton and State of Kansas, have invented a new and useful Wheel-Tire, of which the following is a specification.

It is the object of the present invention to provide an improved tire designed primarily for use on automobile wheels and to take the place of the ordinary clamping tires employed on such wheels.

The tire embodying the present invention includes, in its structure, a series of resilient sections which are arcuate in form, and arranged about the rim of the wheel and the present invention contemplates that those sections shall be so constructed as to overlap in such manner as to prevent their lateral displacement.

In the accompanying drawings—Figure 1 is a view partly in side elevation and partly in longitudinal section through a tire constructed in accordance with the present invention, the rim upon which the tire sections are arranged being also shown. Fig. 2 is a vertical transverse sectional view through the tire and a portion of the wheel upon which it is mounted. Fig. 3 is a sectional view on the line 3—3 of Fig. 2. Fig. 4 is a detailed perspective view of one of the tire sections. Fig. 5 is a similar view of another of the tire sections.

In the drawings, the numeral 6 indicates the hub of the wheel upon which the tire is arranged, 7 the spokes of the wheel and 8 the rim which is supported at the outer ends of the spokes. The rim 8 is formed in its outer circumferential surface with circumscribing grooves 9 one located near each side of the rim.

The tire embodying the present invention consists of a series of sections which are disposed about the rim 8. These sections are clearly illustrated in Figs. 4 and 5 of the drawings and each section is formed of resilient metal and is substantially in the form of an open annulus. The sections are comparatively narrow in a direction circumferentially of the tire as a whole and are smaller at one end than at the other end. In assembling the sections about the rim, the smaller end of each section is fitted into the larger end of the next adjacent section so that the sections, in effect, overlap throughout the entire series. This arrangement of the sections is clearly illustrated in Figs. 1 and 3 of the drawings. The sections illustrated in Fig. 4 of the drawings are indicated by the numeral 10 and those shown in Fig. 5 by the numeral 11, the sections 10 and 11 being identical except that those indicated by the numeral 11 are formed with struck up portions 12 which constitute anti-skidding studs. The sections 10 and 11 may be alternated or, if desired, the sections 11 may be every second, third, or fourth one of the sections of the entire series. Both the sections 10 and the sections 11 have their ends, indicated by the numeral 13, bent to hook shape and in assembling the sections about the rim 8, the hooked ends of the assembled sections are seated in the grooves 9 in the said rim. Clamping rings 14 are then fitted in the hooked ends of the entire number of the sections of the series and the ends of the rings are drawn together by suitable clamping screws 15 thereby causing the rings to bind the ends of the sections in the grooves. By so assembling the sections with each other and with the rim, the sections are held against lateral displacement although the efficiency of the tire as a cushioning element for the wheel is in no way impaired. It will be observed furthermore that the ends of the sections also overlap so that the tire is continuous throughout and flexible to the proper degree.

Briefly considered, the structure herein disclosed comprises the rim 8 and a tire including a plurality of arched members 10—11 disposed transversely of the rim 8, each arched member being of truncated-cone-like shape, and the smaller end of each member being inserted into the larger end of an adjoining member, the larger end of each member being exposed to form a gripping edge 100, the arched members terminating in hooks 13 which bear upon the rim 8, the hooks of the respective arched members being overlapped. A clamping means 14 is provided for engaging the hooks 13. Each hook 13 is extended adjacent the rim 8 and adjacent the smaller end of each member to form a circumferentially projecting foot 101 located diagonally with respect to the gripping edge 100 and coacting with the rim 8 to form a brace which is adapted to limit the tilting movement of each member circumferentially of the rim 8 when the gripping edge 100 engages the ground.

What is claimed is:

In a device of the class described, a rim; a tire comprising a plurality of arched members disposed transversely of the rim, each arched member being of truncated-cone-like form and the smaller end of each member being inserted into the larger end of an adjoining member, the larger end of each member being exposed to form a gripping edge, the arched members terminating in hooks which bear upon the rim, the hooks of the respective members being overlapped; and clamping means engaging the hooks; each hook being extended adjacent the rim and adjacent the smaller end of the corresponding arched member to form a circumferentially projecting foot located diagonally with respect to said gripping edge and coacting with the rim to form a brace adapted to limit the tilting movement of each member circumferentially of the rim when the gripping edge engages the ground.

In testimony that I claim the foregoing as my own, I have hereto affixed my signature in the presence of two witnesses.

HENRY W. DARR.

Witnesses:
LOUIS HEROLD,
PETER APEL.

Copies of this patent may be obtained for five cents each, by addressing the "Commissioner of Patents, Washington, D. C."